United States Patent [19]
Eydelman

[11] Patent Number: 4,653,089
[45] Date of Patent: Mar. 24, 1987

[54] PERSONAL TELEPHONE ADAPTER

[75] Inventor: Grigory Eydelman, 141 St. Paul's Pl., West Hempstead, N.Y. 11552

[73] Assignee: Grigory Eydelman, West Hempstead, N.Y.

[21] Appl. No.: 687,920

[22] Filed: Dec. 31, 1984

[51] Int. Cl.[4] .............................................. H04M 1/72
[52] U.S. Cl. ..................................... 379/179; 379/183
[58] Field of Search .............. 179/84 C, 84 VF, 84 A, 179/84 R, 84 SS, 2 A, 81 R, 18 AD, 17 R, 17 B

[56] References Cited
U.S. PATENT DOCUMENTS

| | | | |
|---|---|---|---|
| 4,037,059 | 7/1977 | Stine | 179/18 AD |
| 4,232,195 | 11/1980 | Bartelink | 179/84 C |
| 4,258,230 | 3/1981 | Hellar et al. | 179/84 SS |
| 4,510,349 | 4/1985 | Segre-Amar | 179/2 A |

Primary Examiner—James L. Dwyer
Attorney, Agent, or Firm—Ostrolenk, Faber, Gerb & Soffen

[57] ABSTRACT

A personal telephone adapter is disclosed which may be connected as an extension on a telephone line and which permits a caller to reach any of several extension telephones within a home or office without a human operator. A ring detector detects an incoming call and begins the operation of a timer, which, after a predetermined time, establishes a connection between the caller and a tone detector in the telephone adapter. Then, the caller may provide an extension signal selecting an extension and, in response, the tone detector in the adaptor at that extension will begin an output such as a tune to a user near the adapter. The user may then pick up the receiver of a telephone instrument and talk to the caller and, for a limited time after picking up the receiver, the user or caller may dial an additional extension signal to another adapter also connected as an extension to the telephone line. The caller may also select an adapter which is for controlling a remote control switch, and the caller may provide signals for switching the remote control switch on and off. In response, the adapter will provide a signal to the caller indicating that the switch is being switched on and off. The circuitry is designed so that a minimal amount of power is drawn prior to receiving a ring signal on the telephone line. When a ring is detected, power is then provided to the other circuitry.

18 Claims, 25 Drawing Figures

PERSONAL TELEPHONE ADAPTER

BACKGROUND OF THE INVENTION

1. Field of the Invention

The invention is related to a device for permitting an outside caller to reach any of several extension telephones within a home or office.

2. Description of the Prior Art

Many homes or offices have a number of extension telephones, all of which share one or more telephone numbers. Each extension telephone is capable of making an outgoing call, and an incoming call may typically be received by any of the extension telephones.

In order to connect an incoming caller to the extension telephone desired, a human operator is typically required. In the conventional system, all incoming calls are answered by a central operator who then rings the extension requested by the caller. In another known system, an incoming call rings on all of the extension telephones, and if any extension is answered, the person answering may then ring the desired extension for the caller.

It would be advantageous for a caller to be able to select an extension telephone without the intervention of a human operator. It would furthermore be advantageous to provide a simple device which could be connected to a conventional extension telephone to permit an incoming caller to select that extension telephone to receive his call.

SUMMARY OF THE INVENTION

The present invention provides a personal telephone adapter which enables an incoming caller to select a desired telephone extension to receive his call. The personal telephone adapter of the invention is provided in a simple device which may be connected directly between a standard telephone instrument and a telephone jack. The adapter may be operated in a common mode in which it functions as a normal extension telephone or in a personal mode in which it functions as a private telephone line by signaling an incoming call only when the caller selects that extension telephone.

A telephone device according to the invention includes call detection means which may include a ring detector circuit and which is connectable as an extension to a telephone line. When the ring detector detects an incoming call, the call detecting means connects to receive an extension signal from the caller. Output means which may include a tone detector receives the extension signal from the caller and provides an output in response to the extension signal if the extension signal indicates a selection of that extension.

The call detection means may further include an answer timing circuit for measuring the time from the beginning of the incoming ringing signal. If the incoming ringing signal continues for a predetermined period of time, the answer timing circuit will provide a connecting signal, causing a connection to be made so that the telephone device may receive an extension signal from the caller. The call detection means may also include a hold coil for holding the voltage on the telephone line low enough that the incoming ringing signal will be stopped and the central telephone control circuit will provide an open line to the caller.

The output means may include a tone detector for detecting the extension signal and for causing an output source to provide an output if the extension signal indicates the selection of that extension. The output may be provided to a user of the device and may also be provided to the caller.

The telephone device may also include a remote control means for receiving a remote control signal from the caller and for controlling an electrical switch according to the remote control signal. In this embodiment, the remote control means may similarly include a signal detector which detects the remote control signal, controls the switch, and also provides an output to the caller indicating that the switch has been operated.

The telephone device may include a control circuit which controls the call detection means and the output means by providing timed signals. The control circuit may include a call memory element which stores an indication that the incoming call signal has been detected and starts a call timer. The control circuit may also include first and second timing circuits for measuring first and second time intervals, during each of which a connection is maintained for receiving the extension signal.

A system according to the invention may include a plurality of such telephone devices. A user at the extension selected by an extension signal during the first time interval may dial an additional extension signal selecting another of the telephone devices during the second time interval. In addition, each of the telephone devices may be provided with a switch for switching into a common mode in which it also provides an output to the user when the incoming call signal is received.

The telephone answering method according to the invention includes detecting an incoming call signal on an extension of a telephone line and automatically connecting to receive an extension signal from the caller after the incoming call signal is detected. The method then includes receiving the extension signal and automatically providing an output in response if the extension signal indicates a selection of that extension.

The telephone answering method may also include maintaining the connection to receive the extension signal for first and second time intervals, and beginning the second time interval whenever the off-hook condition is detected prior to the end of the first time interval.

Other objects, features and advantages of the invention will be apparent from the following desription, together with the accompanying drawings and the appended claims.

DETAILED DESCRIPTION OF THE PREFERRED EMBODIMENTS

1. General Operation

Figure 1:
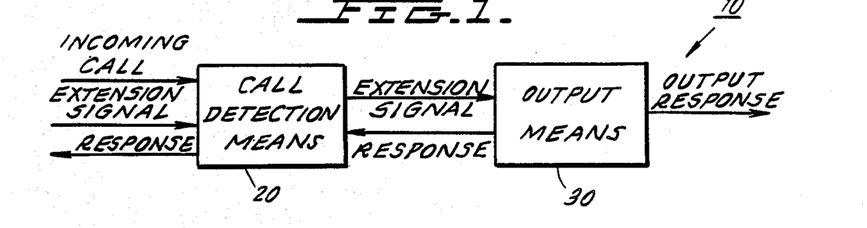
FIG. 1 is an overall block diagram of a telephone device according to the invention.
Figure 2:
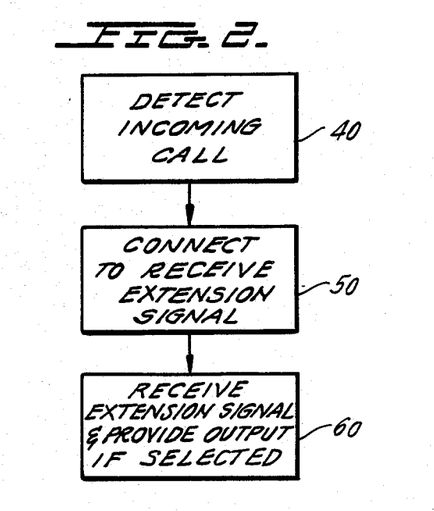
FIG. 2 is a general flow chart showing the telephone answering method of the invention.

The general operation of the telephone device and telephone answering method of the present invention can be understood from FIGS. 1 and 2. FIG. 1 is a schematic block diagram showing the major functional components of telephone device 10 according to the invention. FIG. 2 is a general flow chart showing the steps of the telephone answering method of the invention.

As shown in FIG. 1, telephone device 10 includes call detection means 20 and output means 30. Call detection means 20 includes circuitry which receives an incoming call signal, such as a ringing signal, from a telephone line. Upon detecting the ringing signal, call detection means 20 makes a connection so that an extension signal can be received from the caller. When the extension signal is received, it is provided to the output means 30. If the extension signal indicates that the caller has selected telephone device 10, the output means 30 will provide an output response such as an audible message or tune which can be heard by a user who is near telephone device 10. In addition, output means 30 will provide a response for transmission to the caller to indicate that the output response is being provided at the selected extension.

FIG. 2 is a general flow chart showing the telephone answering method of the invention. The first step is to detect an incoming call, as shown in box 40. When an incoming call is detected, the next step is to make a connection so that an extension signal can be received from the caller, as shown in box 50. If the caller provides an extension signal, it is received and an output is provided if the extension signal indicates that the caller has selected that extension, as shown in box 60.

Although this invention could be implemented in many ways, including the use of a programmable control circuit such as a microprocessor, the presently preferred embodiment is a hard-wired electrical circuit which performs the method of the invention in the manner discussed below.

2. Circuitry

Figure 3:
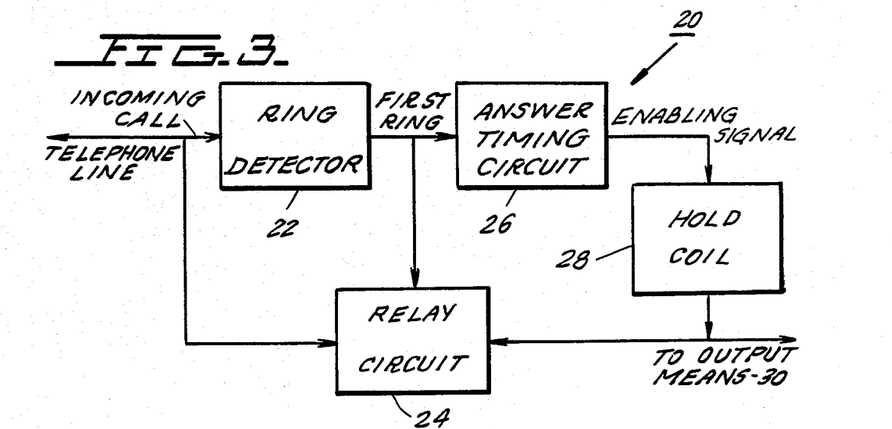
FIG. 3 is a schematic block diagram of the call detection means of FIG. 1.
Figure 4:
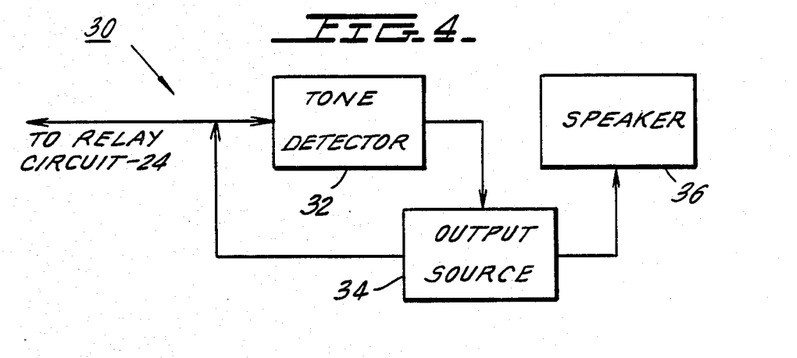
FIG. 4 is a schematic block diagram of the output means of FIG. 1.
Figure 5:
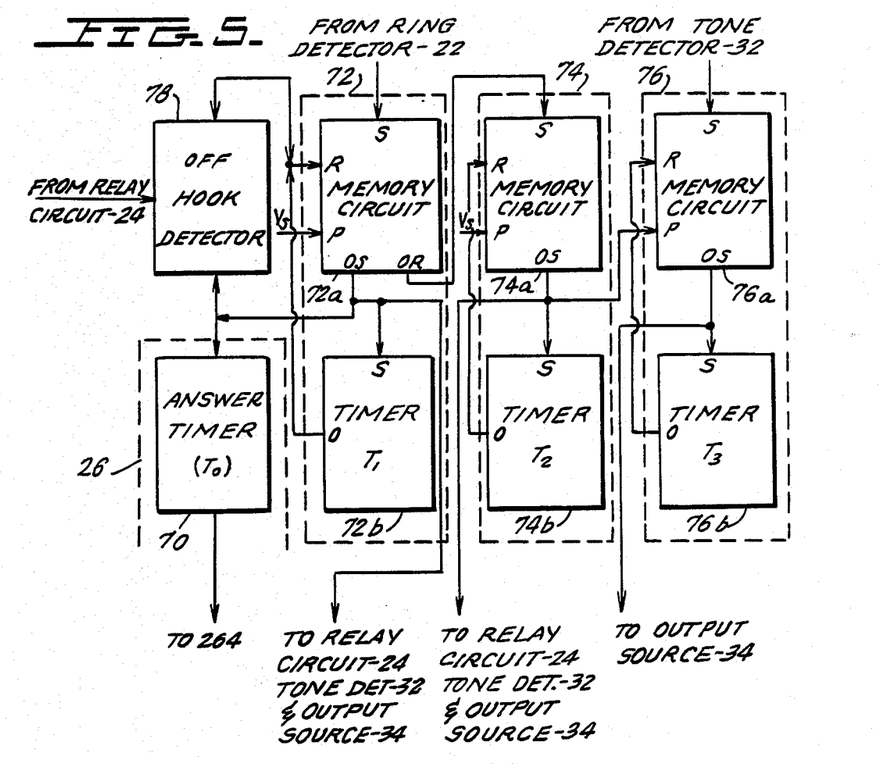
FIG. 5 is a schematic block diagram showing the control circuitry for the components of FIGS. 3 and 4.
Figure 18:
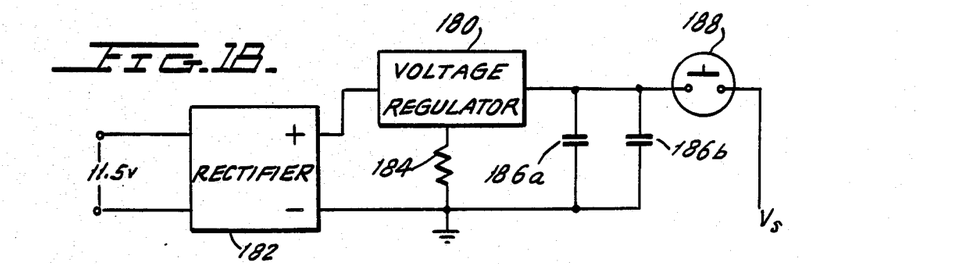
FIG. 18 is a detailed schematic diagram of a power supply for use in the invention.
Figure 19:
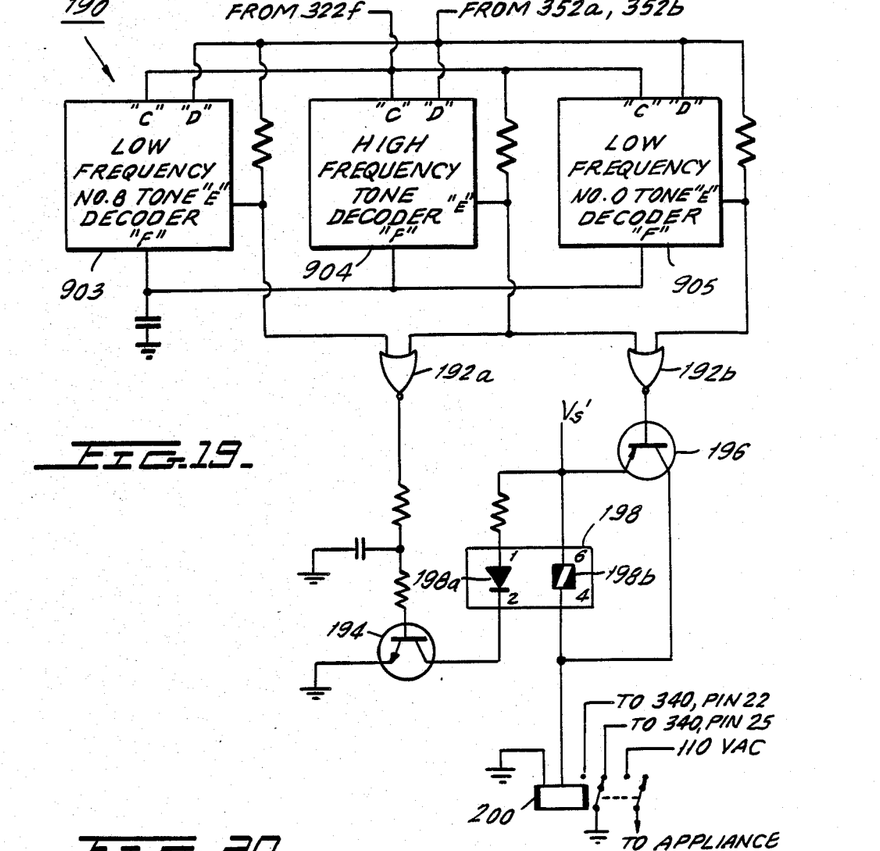
FIG. 19 is a detailed schematic diagram of a remote control circuit which may be used with the circuits of FIGS. 6–18.
Figure 20:
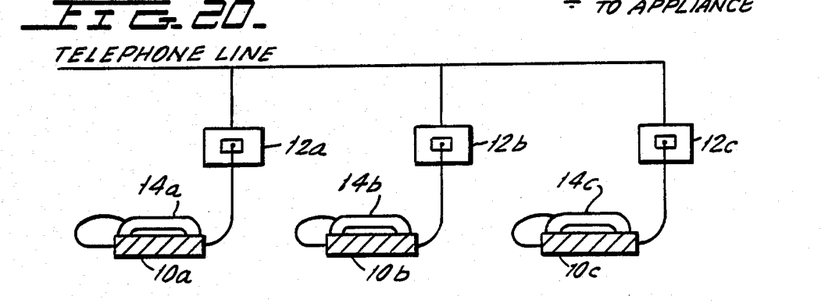
FIG. 20 is a schematic diagram showing the use of a plurality of telephone devices according to the invention.

FIGS. 3–5 show general schematic block diagrams of an embodiment of the major functional components of the telephone device 10 of FIG. 1. FIGS. 6–19 show detailed circuitry for implementing the invention, and FIG. 20 illustrates how several telephone devices according to the invention may be used together.

FIG. 3 shows a circuit which functions as the call detection means 20, shown in FIG. 1. Ring detector 22 is connected to a telephone line and detects the ringing signal caused by an incoming call. Upon detecting the ringing signal, ring detector 22 immediately provides a first ring signal to relay circuit 24 and to answer timing circuit 26. The first ring signal causes relay circuit 24 to provide a connection between the telephone line and a line leading to output means 30. Hold coil 28 is also connected to the line leading to output means 30, and the first ring signal also causes answer timing circuit 26 to provide an enabling signal after a predetermined time to hold coil 28. When hold coil 28 receives the enabling signal, it causes the voltage on the line connected to the telephone line by relay circuit 24 to drop from the open circuit line voltage, typically 48 volts, to a substantially lower hold voltage. The hold voltage is sufficiently low that the central switching control circuitry connected to the telephone line reacts by ending the ringing signal and establishing a connection between the caller and telephone device 10. The hold voltage is not as low as the off-hook voltage which would occur if the receiver of a telephone instrument connected to the line were taken off the hook, as will be discussed in greater detail below.

When a connection is established to the caller through relay circuit 24, as discussed above, output means 30 may receive an extension signal from the caller. As shown in FIG. 4, output means 30 may include a tone detector 32 for detecting a tone which results if the caller presses one of the buttons on a Touch Tone telephone instrument. If the tone detector 32 senses the specific tone which indicates a selection of telephone device 10, it provides a signal to output source 34, and output source 34 drives speaker 36 to provide the output response to the user. In addition, output source 34 is also connected to provide the response through the telephone line to the caller, so that the caller will know that the selected extension has received the extension signal and is providing the output response.

As noted above, the presently preferred embodiment of the invention includes hard-wired circuitry, and FIG. 5 is a functional block diagram showing timing and control circuitry for the components of the call detection means 20 and the output means 30. FIG. 5 shows answer timing circuit 26 in part, including answer timer 70, which is set to provide an output at a time $T_0$ after it receives an input signal. Answer timing circuit 26 receives the input signal from memory circuit 72a, which is a part of a first control circuit 72. Memory circuit 72a is set by a signal from ring detector 22, and immediately provides an output set signal at its input power level $V_s$ to answer timing circuit 26 and timer 72b. After time $T_1$, which is longer than time $T_0$, timer 72b provides an output to memory circuit 72a, causing memory circuit 72a to be reset. When memory circuit 72a is reset, it provides an output signal to second control circuit 74, discussed below. As shown in FIG. 5, the output set signal from memory circuit 72a is also provided to relay circuit 24, tone detector 32, output source 34 and off-hook detector 78.

Like control circuit 72, control circuit 74 includes memory circuit 74a and timer 74b. Memory circuit 74a is connected to be set by the output reset signal from memory circuit 72a. When it is set, memory circuit 74a provides an output set signal at its input power level $V_s$ to timer 74b and to relay circuit 24, tone detector 32 and output source 34. In addition, the output set signal from memory circuit 74a provides power to memory cicuit 76a in control circuit 76. After a time $T_2$, timer 74b provides an output to memory circuit 74a which causes it to be reset, so that it no longer provides the output set signal.

The third control circuit 76 similarly includes memory circuit 76a and timer 76b. Memory circuit 76a is set by a signal from tone detector 32 and immediately provides an output set signal to output source 34 and to timer 76b. After time $T_3$, timer 76b then provides an output to memory circuit 76a, causing it to be reset, so that the output set signal ends.

The timing and control circuitry shown in FIG. 5 controls the operation of the components of call detection means 20 and output means 30. Answer timing circuit 26, as discussed above, controls the operation of hold coil 28 to establish a connection for receiving the extension signal. Control circuit 72 controls relay circuit 24, tone detector 32 and output source 34, making it possible to detect the extension signal during time $T_1$. Then, when memory circuit 72a is reset, control circuit 74 similarly enables the detection of an extension signal during time $T_2$. If an extension signal received during $T_2$ selects telephone device 10, control circuit 76 then activates output source 34 during time $T_3$.

FIG. 5 also shows off-hook detector 78, which is activated by the output set signal from memory circuit 72a and is connected through relay circuit 24 to the telephone line. When off-hook detector 78 detects the off-hook voltage which results if the receiver of a telephone instrument connected to the telephone line is taken off the hook, off-hook detector 78 provides an off-hook signal which functions to reset memory circuit 72a. As discussed above, the resetting of memory circuit 72a ends the output set signal and begins the period $T_2$ during which control circuit 74 enables the detection of an extension signal.

As can be seen from FIG. 5, the use of highly similar control circuits 72, 74 and 76 provides a simple arrangement in which several identical components may be used.

Figure 6:
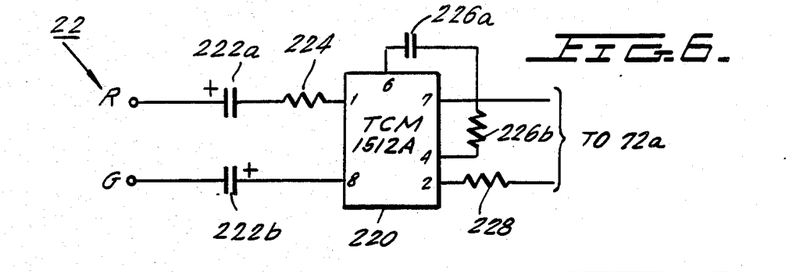
FIG. 6 is a detailed schematic diagram of the ring detector of FIG. 3.
Figure 7:
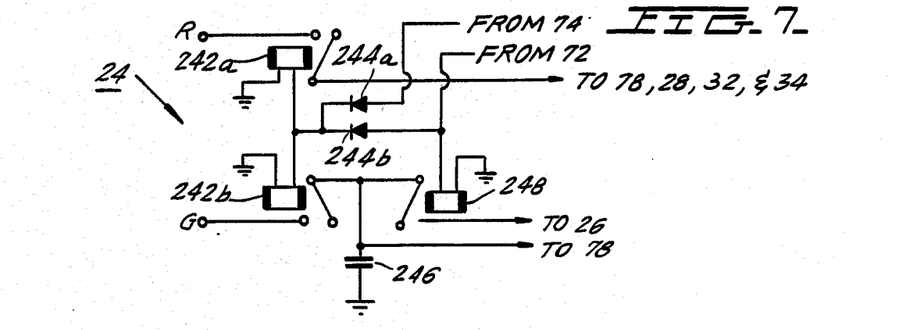
FIG. 7 is a detailed schematic diagram of the relay circuit of FIG. 3.
Figure 9:
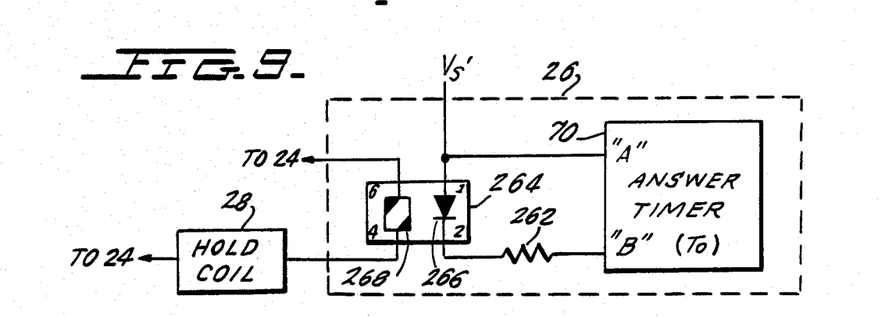
FIG. 9 is a detailed schematic diagram of the answer timing circuit and hold coil of FIG. 3.
Figure 10:
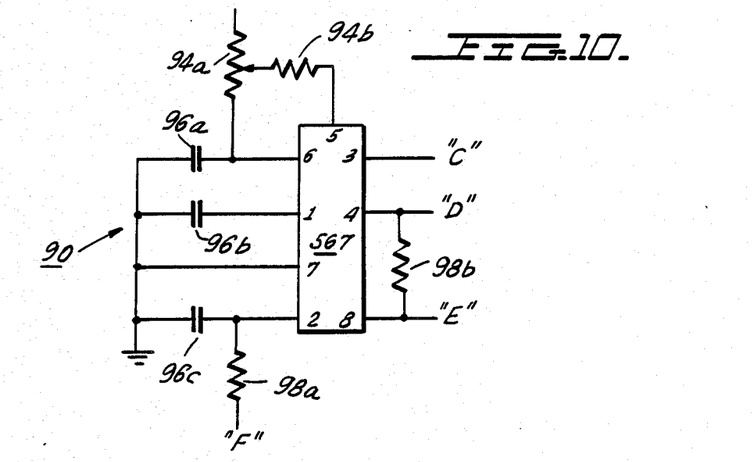
FIG. 10 is a detailed schematic diagram of a tone decoder for use in the invention.
Figure 11:
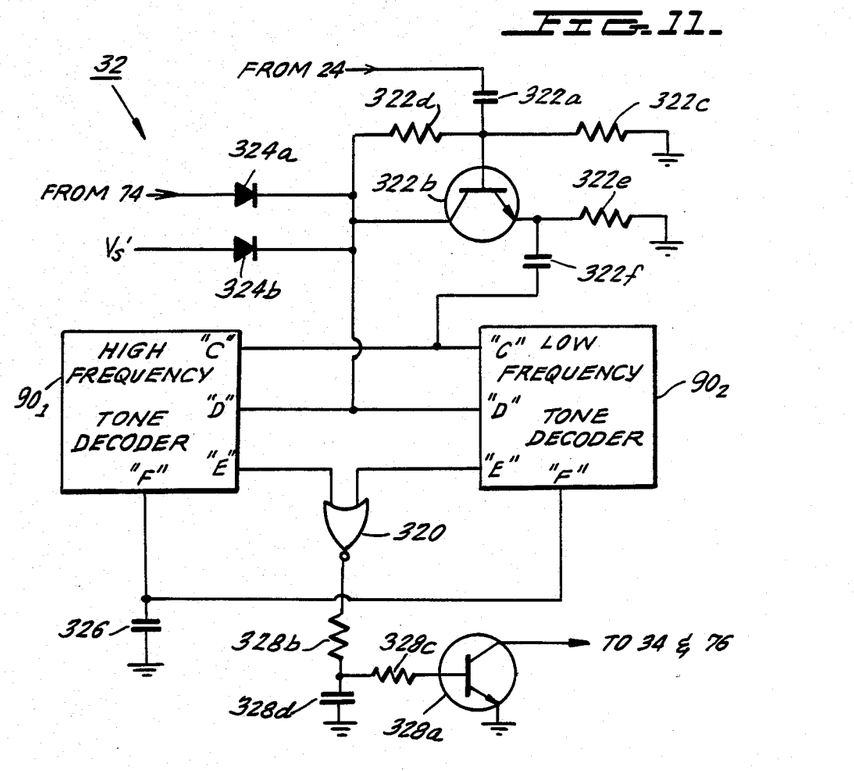
FIG. 11 is a detailed schematic diagram of the tone detector of FIG. 4.
Figure 12:
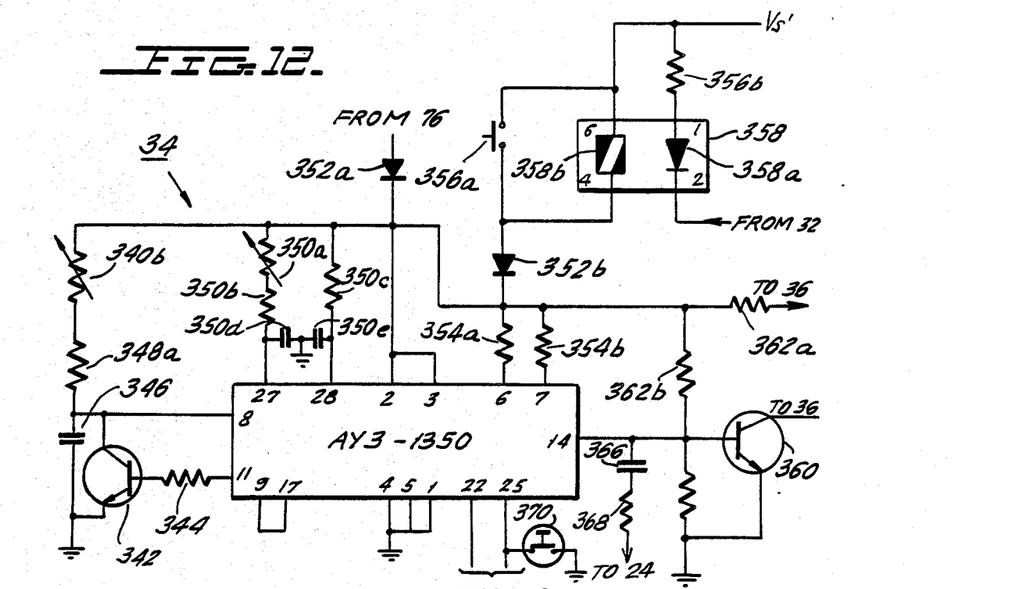
FIG. 12 is a detailed schematic diagram of the output source of FIG. 4.

FIGS. 6-19 are schematic circuit diagrams for the components shown in FIGS. 3-5 and for other circuitry which may be used in a preferred embodiment of the invention. FIGS. 6, 7 and 9 show circuitry for the call detection means 20, FIGS. 10-12 show circuitry for the output means 30, and FIGS. 8 and 13-17 show circuitry for the timing and control circuit of FIG. 5. FIG. 18 shows a power supply circuit and FIG. 19 shows an additional remote control circuit which may be used in the invention.

FIG. 6 shows ring detector circuit 22, the central component of which is integrated ring detector circuit 220, which, as shown, may be a Tandy TCM 1512A chip. Electrolytic capacitors 222a and 222b are connected between ring detector 220 and the red and green leads from the telephone line, respectively. Capacitor 222a, connected to the red lead, which is typically at 48 volts, may be a 1.5 microfarad capacitor rated for 100 volts. Similarly, capacitor 222b, connected to the green lead, which is conventionally the common line, may be a 10 microfarad capacitor rated for 100 volts. Resistor 224 may be 2.2 Kohms; capacitor 226a may be a 10 microfarad capacitor rated for 100 volts; resistor 226b may be 33 Kohms; and resistor 228 may be 4.3 Kohms. In operation, ring detector 22 will provide an output signal to memory circuit 72a upon receiving a ringing signal from the telephone line. Because of capacitors 222a and 222b, however, no DC current will be drawn by the ring detector circuit 220 or any other part of device 10 when no ringing signal has been received, which is very important in obtaining FCC approval.

FIG. 7 shows the relay circuit 24 of the presently preferred embodiment of the invention. Normally open relays 242a and 242b are connected in lines leading from the red and green leads of the telephone line, respectively. A signal from control circuit 74 through diode 244a or from control circuit 72 through diode 244b will cause relays 242a and 242b to close, completing a circuit through off-hook detector 78, which is therefore able to detect the voltage on the telephone line. As shown, the green lead is connected through capacitor 246, which may be 0.2 microfarads to ground. In addition, relay 248 is connected in the line between relay 242b and answer timing circuit 26. In response to a signal from control circuit 72, relay 248 closes, completing a circuit through answer timing circuit 26 and hold coil 28, as discussed below. In addition, the closing of relay 242a connects the red lead of the telephone line to tone detector 32 and to output source 34, so that tone detector 32 may detect the extension signal from the caller and output source 34 may provide the response to the caller.

Figure 8:
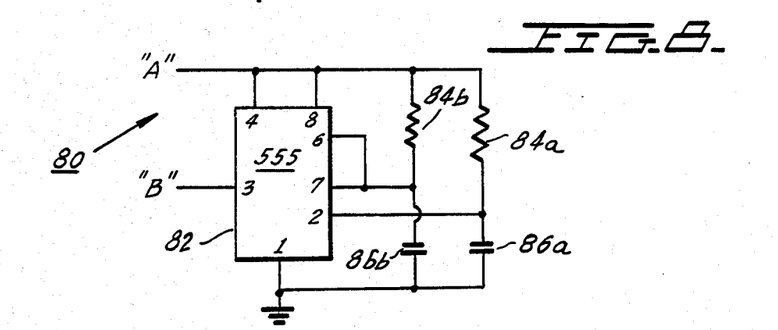
FIG. 8 is a detailed schematic diagram of a timer for use in the invention.

FIG. 8 shows a timing circuit 80 which may be used in answer timer 70 or any of timers 72b, 74b or 76b. As shown in FIG. 8, timer circuit 80 is based on an integrated timing circuit such as a 555 chip. Resistors 84a and 84b and capacitors 86a and 86b may be chosen to obtain the desired timing period. For example, resistor 84a, resistor 84b, capacitor 86a and capacitor 86b could be selected to provide a 60 second time period. In addition, timing circuit 80 includes leads A and B for connection to other components, as discussed in relation to each of the timing circuits below. A rising edge on terminal A begins the timing period, and the voltage on terminal B goes low at the end of the timing period.

FIG. 9 shows answer timing circuit 26 connected to hold coil 28. Answer timing circuit 26 includes answer timer 70 which may be the same as timing circuit 80 in FIG. 8, but with appropriate resistors and capacitors to obtain a desired answer timing period $T_0$. The B terminal of answer timer 70 is connected through resistor 262, which may be 470 ohms, to optocoupler 264. The A terminal of answer timer 70 may be connected to a voltage $V_s'$, which is also connected to optocoupler 264 such that when voltage $V_s'$ is provided, answer timer 70 begins to measure time $T_0$. At the end of time $T_0$, the voltage on terminal B drops, so that infrared emitting diode 266 in optocoupler 264 begins to emit infrared radiation. This radiation causes switchable element 268, which may be a silicon bilateral switch, to become conductive, enabling hold coil 28 to bring the voltage on the telephone line down to the holding voltage. Hold coil 28 may be a standard hold coil having a resistance of approximately 400 ohms. The resistance of hold coil 28 is sufficiently higher than the resistance in a standard telephone instrument, generally in the range of 150–200 ohms, so that the holding voltage will be somewhat higher than the connected voltage which occurs when the receiver of the telephone instrument is taken off the hook. Once switchable element 268 has become conductive, it will remain conductive until the voltage across it drops below a characteristic threshold voltage, so that hold coil 28 may remain activated after voltage $V_s'$ is turned off.

FIG. 10 shows a tone decoder circuit 90 which may be used in tone detector 32 and remote control circuit 190, discussed below. Tone decoder circuit 90 is based on an integrated tone decoder circuit 92, which may be a standard tone decoder chip such as an XR-L567 chip. Potentiometer 94a and fixed resistor 94b provide the timing resistor for detector circuit 92. Potentiometer 94a may be a variable 10 Kohm resistor, while fixed resistor 94b may be an appropriate value for the desired frequency. Capacitor 96a provides the timing capacitor, but may in general be 0.1 microfarads. Capacitor 96b provides the output filter and may, for example, be 2.2 microfarads. Capacitor 96c may be 1.0 microfarads and resistor 98a may be 4.7 Kohms. Resistor 98b, which may be 20 Kohms, holds the output of detector circuit 92 high. As shown in FIG. 10, tone detector circuit 90 has four terminals C, D, E and F which are connected as discussed below. Terminal C is the signal input, terminal D is the power input and terminal E is the output.

FIG. 11 shows tone detector 32 including tone decoder circuits $90_1$ and $90_2$, each of which may be constructed like detector circuit 90 from FIG. 10. Tone decoder $90_1$ is a high frequency tone decoder, so that its fixed timing resistor 94b may be 6.8 Kohms and potentiometer 94a may be tuned to the desired tone. Tone decoder $90_2$ is a low frequency tone decoder so that its fixed timing resistor 94b may be 5.6 Kohms and potentiometer 94a may be tuned to the desired tone. The outputs from tone decoders $90_1$ and $90_2$ are fed through NOR gate 320, which may be part of a conventional 74LS02 chip, and which will function to provide a high signal whenever both tone decoders $90_1$ and $90_2$ detect the corresponding tone. The input signal to the tone decoders $90_1$ and $90_2$ is fed through input capacitor 322a, which may be 0.2 microfarads, to the base of amplifying and insulating transistor 322b. The base of transistor 322b is biased by resistors 322c and 322d, each of which may be 220 Kohms. In addition, the emitter of transistor 322b is connected to ground through resistor 322e, which may be 5.6 Kohms, and to the input terminals C of the tone decoders $90_1$ and $90_2$ through capacitor 322f, which may be 0.2 microfarads. Power for biasing the base of transistor 322b and for operating tone decoders $90_1$ and $90_2$ is provided through diodes 324a and 324b. As shown in FIG. 11, power will be provided when voltage $V_s'$ is turned on at the beginning of time $T_1$ and by control circuit 74 during $T_2$. The tone decoders $90_1$ and $90_2$ are both connected for low pass filtering through capacitor 326, which may be 220 microfarads. The output of NOR gate 320 is connected to the base of transistor 328a through resistors 328b and 328c. Filtering capacitor 328d may be 220 microfarads. When transistor 328a is turned on by the output of NOR gate 320, it will complete a circuit to ground from output source 34 and control circuit 76, as discussed in greater detail below.

FIG. 12 shows the circuitry of output source 34, which is based on an integrated tune synthesizer circuit, such as a mask programmable AY3-1350 chip. As shown, tune synthesizer 340 may be connected to transistor 342 through resistor 344, which may be 10 Kohms. Across the emitter and collecter of transistor 342 may be connected capacitor 346, which may be 0.22 microfarads. Resistor 348a and variable resistor 348b may each be 1 Mohm. Variable resistor 350a may be 20 Kohms and resistor 350b may be 4 Kohms. Resistor 350c may be 100 Kohms. Capacitor 350d may be 47 picofarads and capacitor 350e may be 0.1 microfarads.

The power input to tune synthesizer 340 may be provided either through diode 352a from control circuit 76 or through diode 352b from voltage $V_s'$. Resistors 354a and 354b may each be 33 Kohms. The power from voltage $V_s'$ is provided through a circuit including mode switch 356a and resistor 356b, which may be 470 ohms. If mode switch 356a is opened, as shown, power can only be provided when optocoupler 358 is connected to ground through transistor 328a, discused above in relation to tone detector 32. In that case, infrared emitting diode 358a will begin to conduct, and will activate switchable element 358b, which will provide power through diode 352b during period $T_1$. If, however, mode switch 356a is closed, tune source 34 will receive power throughout time $T_1$ and will therefore be activated whenever the incoming call signal is detected. In general, when mode switch 356a is open, the telephone device 10 is in a personal mode in which it only responds if the corresponding extension signal is provided. But if mode switch 356a is closed, telephone device 10 is in a common mode in which it responds to any incoming call.

The output from tune synthesizer 340 is provided through transistor 360 to a speaker 36. Resistors 362a and 362b may be 47 ohms and 27 Kohms, respectively and resistor 364 may be 33 Kohms. The output from tune synthesizer 340 is also connected to the telephone line through relay circuit 24 and through capacitor 366, which may be 0.1 microfarads, and resistor 368, which may be 100 ohms.

Tune synthesizer 340 may be capable of generating 25 tunes, for example, by making appropriate connections of its pins. For the AY3-1350 chip, the tune selection may be made by connecting pin 15 to open or to any of pins 9, 18, 19 or 20. The letter selection may be made by connecting one of pins 21, 22, 23, 24 or 25 to ground. Switch 370, as shown, may be used to hold pin 25 to ground, and pin 15 may be connected, for example, to pin 20 to indicate a specific extension. Then, to select remote control operation, switch 370 is opened, so that pin 25 is not grounded. The subsequent grounding of pin 25 will provide a first extension select output which will indicate that the selected extension is connected to an appliance which is not connected to power. The grounding of pin 22, however, will provide a second extension select output indicating the selected extension's appliance is connected to power. These outputs will be provided to the caller as well as to a local user, and will be provided both when the power is switched, as discussed below, and when the caller selects that extension.

Figure 13:
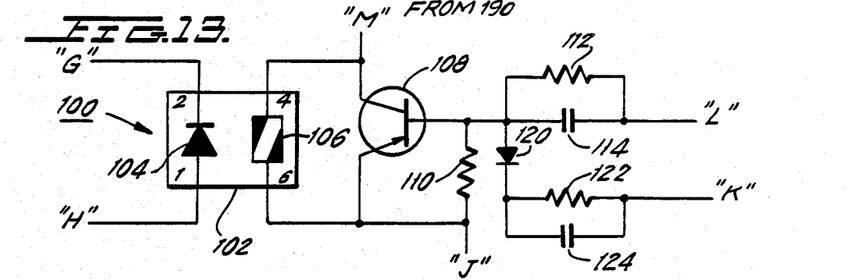
FIG. 13 is a detailed schematic diagram of a memory circuit for use in the invention.

FIG. 13 shows memory circuit 100 which may be used for each of the memory circuits 72a, 74a and 76a. Memory circuit 100 includes optocoupler 102, which like optocouplers 264 and 358, discussed above, may be an MOC3010 isolation circuit including infrared emitting diode 104 and switchable element 106. When diode 104 is conducting a current, it will emit radiation activating switchable element 106 which will in turn become conductive. Switchable element 106 will remain conductive until transistor 108 is turned on. As illustrated, transistor 108 may be an npn transistor, which will be made conductive momentarily by a pulse of low voltage on its base. The base voltage of transistor 108 may ordinarily be held at a high value through resistor 110, which may be 5.6 Kohms. The base voltage may be dropped momentarily through a circuit including resistor 112, which may be 1 Mohm, and capacitor 114, which may be 0.47 microfarads, or it may be dropped momentarily through a diode 120 and through a similar circuit including resistor 122, which may be 1 Mohm, and capacitor 124, which may be 0.22 microfarads.

As shown in FIG. 13, memory circuit 100 will have terminals G, H, J, K, L, and M for connecting to other circuitry. A voltage across terminals G and H sets the memory circuit 100, while a pulse of low voltage on terminals K or L resets it. Power is received on terminal J, and the output is on terminal M.

Figure 14:
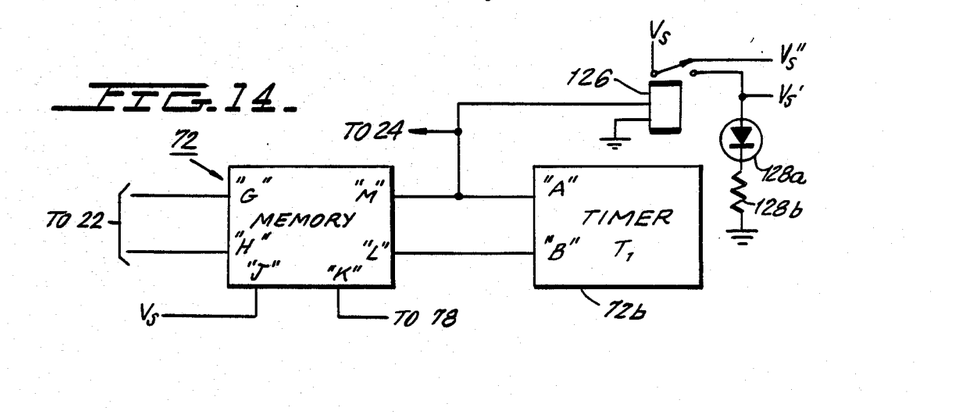
FIG. 14 is a detailed schematic diagram of the first control circuit of FIG. 5.

FIG. 14 shows control circuit 72, including memory circuit 72a, based on memory circuit 100 of FIG. 13, and timer 72b, based on timing circuit 80 of FIG. 8. Voltage $V_s$ is provided to terminal J of memory 72a, and memory 72a is set by a voltage across terminals G and H, provided by ring detector 22. Memory 72a may be reset by timer 72b through terminal L or by off-hook detector 78 through terminal K. Memory circuit 72a will provide its output set signal by providing a high voltage on output terminal M to relay circuit 24 and to relay 126. When relay 126 receives the high output, it will switch to connect voltage $V_s$ to provide the voltage $V_s'$, and will activate LED 128a, providing a visible signal that a call is being received. Resistor 128b may be 470 ohms. When memory circuit 72a is reset, it will provide an output reset signal in the form of a low voltage on terminal M, turning off relay circuit 24 and causing relay 126 to connect voltage $V_s$ to provide voltage $V_s''$, which will provide a set signal to control circuit 74, as discussed below.

Figure 15:
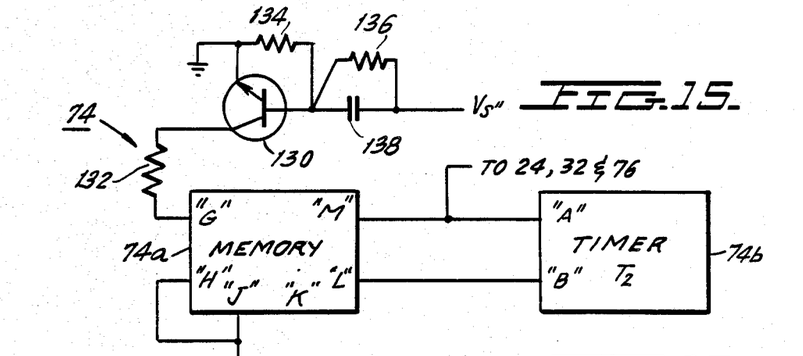
FIG. 15 is a detailed schematic diagram of the second control circuit of FIG. 5.

FIG. 15 shows control circuit 74, which also includes memory circuit 74a, which may be like a memory circuit 100 in FIG. 13, and timer 74b, which may be like timing circuit 80 in FIG. 8. Memory circuit 74a will be set by voltage $V_s''$, received from memory circuit 72, discussed above. Voltage $V_s''$ will turn on transistor 130, dropping the voltage at terminal G of memory circuit 74a through resistor 132, which may be 470 ohms. The base of transistor 130 may oridinarily be grounded through resistor 134, which may be 5.6 Kohms, and the input voltage $V_s''$ may be received through resistor 136, which may be 1 Mohm and capacitor 138, which may be 0.22 microfarads. Memory circuit 74a may be reset only by timer 74b after time $T_2$, through terminal L. During time $T_2$, memory circuit 74a will maintain a high voltage to relay circuit 24, tune detector 32 and control circuit 76 through terminal M.

Figure 16:
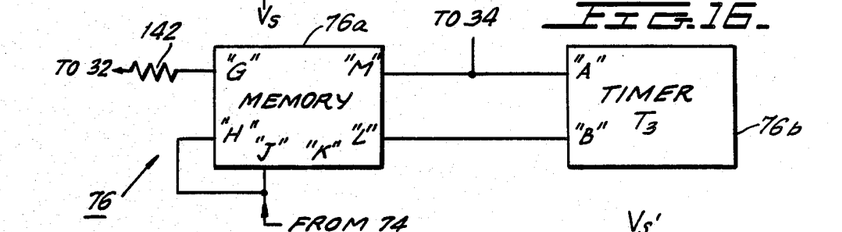
FIG. 16 is a detailed schematic diagram of the third control circuit of FIG. 5.

FIG. 16 shows control circuit 76 which similarly includes memory circuit 76a, like memory circuit 100 in FIG. 13, and timer 76b, like timing circuit 80 in FIG. 8. Memory circuit 76a will be set if, during time $T_2$, transistor 328a in tone detector 32 is momentarily turned on, permitting current to flow through resistor 142. Memory circuit 76a can only be reset by timer 76b after time $T_3$. While it is set, memory circuit 76a will provide a high voltage to output source 34 through terminal M, permitting output source 34 to provide a tune for time $T_3$.

Figure 17:
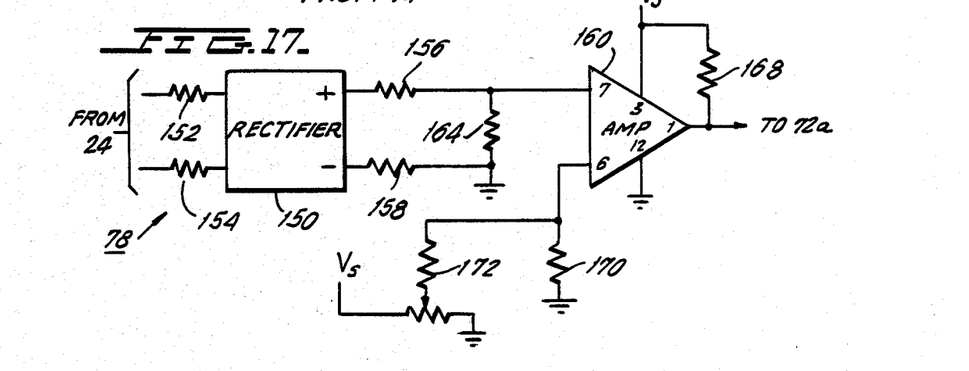
FIG. 17 is a detailed schematic diagram of the off-hook detector of FIG. 5.

FIG. 17 shows an off-hook detector circuit 78 for use in the present invention. As shown in FIG. 17, rectifier 150 is connected to the telephone line through relay circuit 24 and resistors 152 and 154, which may each be 180 Kohms. Rectifier 150 will provide its output through resistors 156 and 158, which may each be 180 Kohms, and across resistor 164, which may be 1 Mohm, to comparing amplifier 160, which may be a conventional LN339 amplifier. Amplifier 160 receives power when voltage $V_s'$ is on, which is during time $T_1$. The output of amplifier 160 is ordinarily held high through resistor 168, which may be 24 Kohms. When the input from rectifier 150 falls below the voltage provided through resistances 170 and 172, amplifier 160 will pull its output voltage low, resulting in the resetting of memory circuit 72a through its terminal K. Resistor 170 may be 47 Kohms, and potentiometer 172 may include a 1 Kohm resistor, connected at a selected position on a 10 Kohm potentiometer between $V_s$ and ground.

FIG. 18 shows a power supply circuit which provides the voltage $V_s$ to the circuitry described above. Rectifier 182 is connected for receiving input power at 11.5 volts, and for providing it to voltage regulator 180, which may be a standard 7805 voltage regulator chip. Resistor 184 may be 200 ohms, capacitor 186a may be 0.1 microfarads, and capacitor 186b may be 2,200 microfarads. Switch 188, shown in the open position, will be closed during normal operation, but may be opened in order to reset the circuitry. The voltage $V_s$ will ordinarily be 6.2 volts if the components have the values described above. As will be seen by studying the circuit diagram, power from the power supply circuitry of FIG. 18 will be loaded primarily across the 10 Kohm resistance in the potentiometer 172 except when an incoming call has been detected. As a result, the power loss during normal operation of the telephone device 10 will be extremely low and the current drawn will typically be about 0.62 ma.

Although the basic embodiment of the telephone device 10 discussed above provides the capability of both receiving an extension signal from a caller, further capabilities may be provided by adding the remote control circuit 190 shown in FIG. 19. Remote control circuit 190 includes three tone decoders $90_3$, $90_4$ and $90_5$ like the tone decoder 90 in FIG. 10. Tone decoder $90_3$ is set to detect the low frequency tone which is provided when the number 8 is pressed on a Touch Tone keyboard, and the tone decoder $90_4$ is set to detect the high frequency tone. Tone decoder $90_5$ is set to detect the low frequency which is provided when the number 0 is depressed on a Touch Tone keyboard, and the high frequency tone is the same as for the number 8. When the frequencies corresponding to the number 8 are received at the C terminals of tone decoders $90_3$ and $90_4$, the outputs at terminals E will both be pulled low. As a result, NOR gate 192a will turn on transistor 194, turning on optocoupler 198 by activating infrared emitting diode 198a. As a result, switchable element 198b will become conductive, activating normally open relay 200 to turn on a switch by closing a connection between standard household current at 110 VAC and an appliance. In addition, pin 22 of tune synthesizer 340 will be grounded, causing it to provide the second extension select output indicating that a switch has been turned on at the selected extension. Then, when the tones corresponding to 0 are received from the caller, at terminals C of tone decoders $90_4$ and $90_5$, the output on terminals E of those tone decoders will similarly be drawn low.

As a result, NOR gate 192b will turn on transistor 196, causing the voltage across switchable element 198b to drop below threshold, so that switchable element 198b will become non-conductive. At that time, relay 200 will open, turning off the switch. At the same time, pin 25 of tune synthesizer 340 will be grounded, causing it to provide the first extension select output indicating that the switch has been turned off at the selected extension.

FIG. 20 shows how several telephone devices 10a, 10b and 10c may be connected as extensions on the same telephone line. As shown, each of the telephone devices 10a, 10b and 10c is connected through a respective telephone jack 12a, 12b and 12c. Only one of devices 10a, 10b and 10c will have an operative hold coil 28 however. The operation of answer timer 70 may be stopped in the other devices, or other appropriate steps may be taken. Also, the times $T_1$ and $T_2$ must be approximately equal for all devices 10a, 10b and 10c. A telephone receiver 14a, 14b, 14c is connected through each telephone device 10a, 10b, 10c to the telephone line, so that a user may pick up the corresponding receiver 14 when the telephone device 10 provides a tune indicating that the corresponding extension signal has been received. The receivers 14a, 14b, 14c will actually be connected directly to the red and green leads of the telephone line, parallel to devices 10a, 10b and 10c, but this connection may be made through a jack on the respective device 10a, 10b or 10c.

The operation of the circuitry shown in FIGS. 3-20 will follow the method of the invention, as discussed in greater detail below. In addition, however, a number of other circuits could be provided for performing the method of the invention.

3. Method of Operation

The general steps of the telephone answering method according to the invention have been discussed above in relation to FIG. 2. FIGS. 21-25, however, show in greater detail how the method of the invention may be implemented.

Figure 21:
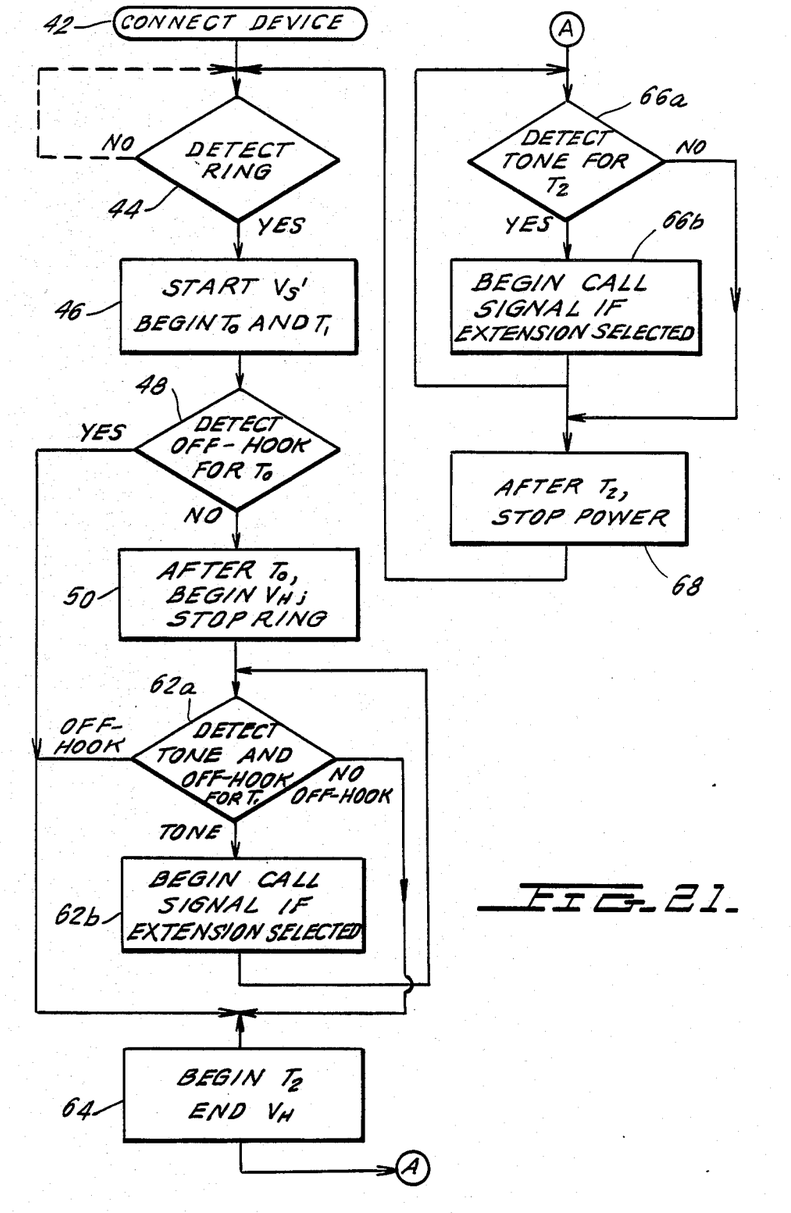
FIG. 21 is a detailed flow chart of the telephone answering method of FIG. 2.

FIG. 21 is a flow chart showing the main features of the method of the invention as implemented by the circuitry described above. As shown at step 42, the telephone device 10 is first connected to the telephone line. The next step is to detect an incoming call signal such as a ring, as shown at step 44. Since ring detector 22 operates continuously, step 44 will continue until a ring is detected. As shown in dashed line, however, it would also be consistent with the invention for the ring detecting step 44 to be repeated after each failure to detect a ring. When a ring is detected, voltage $V_s'$ is provided to the tone detector 32, output source 34 and off-hook detector 78, and answer timer 70 and $T_1$ timer 72b begin to measure times $T_0$ and $T_1$, respectively, in step 46. Then, until time $T_0$ ends, off-hook detector 78 senses the voltage on the telephone line in step 48. If the off-hook voltage is not detected until $T_0$ ends, step 50 is the next step, but if the off-hook voltage is detected, the method proceeds directly to step 64.

In step 50, the hold coil 28 is enabled by answer timing circuit 26, so that the voltage on the telephone line drops to the holding voltage $V_H$. This causes the central telephone switching circuitry to stop the ringing signal and to create a connection between the caller and the telephone device 10. This makes it possible for the tone detector 32 to detect an extension signal from the caller.

In step 62a, tone detector 32 and off-hook detector 78 are both connected to the telephone line. If the tone which selects that extension is detected, the call signal is begun in step 62b, and the tone and off-hook detection of step 62a is then continued for the remainder of time $T_1$. On the other hand, if the off-hook voltage $V_o$ is detected during step 62a, step 64 is immediately performed, as shown. In addition, if time $T_1$ ends with no off-hook voltage being detected, step 64 is then performed. In step 64, control circuit 74 begins measuring $T_2$, and hold coil 28 is disabled, so that the voltage on the telephone line rises to the line voltage $V_L$ unless a receiver has been taken off the hook, dropping the voltage to the connected off-hook voltage $V_o$. If the voltage has dropped to $V_o$ then during time $T_2$, tone detector 32 again detects in step 66a, and begins the call signal from output source 34 if the tone indicates the selection of that extension in step 66b. At the end of time $T_2$, step 68 is performed in which control circuit 74 stops providing power to tone detector 32, output source 34 and off-hook detector 78. After step 68, telephone device 10 returns to step 44, in which it detects incoming calls.

FIGS. 22-25 are examples of the method of telephone answering according to the invention, each of which follows the flow chart of FIG. 21 along a corresponding path. In each case, the voltage on the telephone line, which may be the line voltage $V_L$, the hold voltage $V_H$ or the off-hook voltage $V_o$, varies as a function of time.

Figure 22:
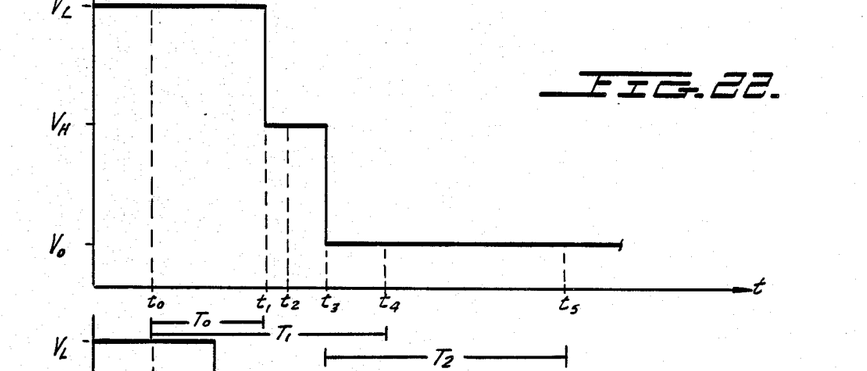
FIGS. 22–25 are timing diagrams illustrating the operation of the invention.

In FIG. 22, voltage $V_L$ continues after time $t_0$, when the first ring is detected, for the whole length of time $T_0$, until time $t_1$. At time $t_1$, the hold coil 28 is connected, causing the voltage to drop to $V_H$. Then, at time $t_2$, an extension signal is received from the caller causing a user to pick up the receiver at the selected extension at time $t_3$. At $t_3$, the off-hook detector therefore detects the off-hook voltage $V_o$ and resets memory circuit 72a, thereby causing time $T_2$ to begin with the setting of memory circuit 74a. During time $T_2$, time $T_1$ expires at time $t_4$ but this has no effect because time $T_2$ has already begun. During time $T_2$, the caller or the user could provide a second extension signal, selecting another extension. At the end of time $T_2$, the tone detector 32 is swtiched off at time $t_5$.

Figure 23:
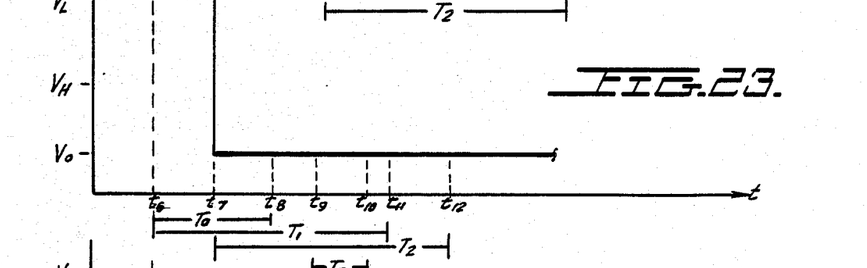

In FIG. 23, the ring is detected at time $t_6$, beginning time $T_0$, but a user takes his receiver off the hook at time $t_7$, causing the voltage to drop to $V_o$. Off-hook detector 78 resets memory circuit 72a, switching off relay circuit 24, tone detector 32 and output source 34, and setting memory circuit 74a. As a result, relay circuit 24, tone detector 32 and output source 34 are immediately switched back on and timer 74b immediately begins measuring time $T_2$, so that the endings of times $T_0$ and $T_1$ at times $t_8$ and $t_{11}$ have no effect. During time $T_2$, either the user who has picked up the receiver or the caller may provide an extension signal, as shown at time $t_9$, which will result in a tune being played for time $T_3$, until time $t_{10}$. Then, at the end of time $T_2$, the tone detector will be switched off at time $t_{12}$.

Figure 24:
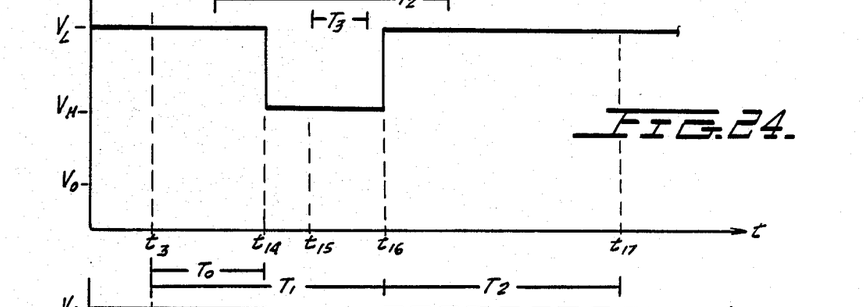

FIG. 24 illustrates the sequence of steps when there is no response to the first extension signal and the caller provides a second extension signal. At time $t_{13}$, the first ring is received, beginning times $T_0$ and $T_1$. When $T_0$ ends, the hold coil 28 is connected, bringing the voltage down to $V_H$ at time $t_{14}$. Then, at time $t_{15}$, the caller provides a first extension signal, resulting in a tune in the telephone device 10. If no user removes a receiver from the hook before the end of time $T_1$, the voltage returns to $V_L$ when hold coil 28 is disconnected by the opening of relay 248 at time $t_{16}$ and the central telephone control circuitry disconnects the caller from device 10. The ending of time $T_2$ at $t_{17}$ has no effect.

Figure 25:
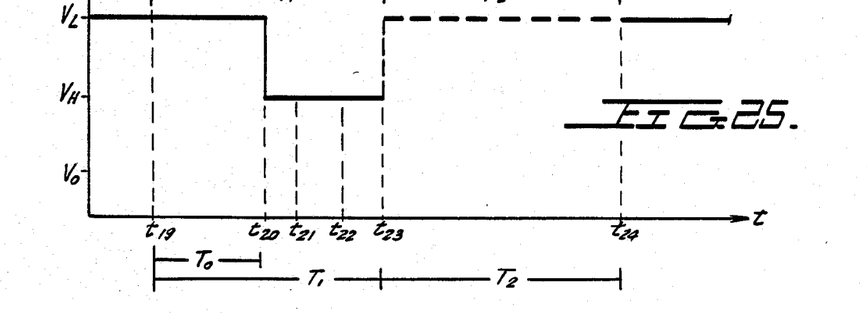

FIG. 25 illustrates the operation of remote control circuitry 190 of FIG. 19. As shown, the ringing continues for the full time $T_0$, from time $t_{19}$ to time $t_{20}$. While the voltage is at $V_H$, the caller provides an extension signal at time $t_{21}$. If the appliance at the selected extension is turned off, the tune synthesizer 340 will provide the first extension select output. The caller may then provide the switch on signal at time $t_{22}$, and the second extension select output, indicating the appliance at the selected extension is turned on may be provided to the caller. At the end of time $T_1$, the voltage returns to $V_L$ at time $t_{23}$, when hold coil 28 is disconnected. The ending of time $T_2$ at $t_{24}$ has no effect.

From the above detailed description, it is clear that there are many alternative embodiments of the invention. The memory circuits of the invention have been described as including optocouplers, for example, but these elements could be replaced by any other storage circuit, including a flip-flop or other similar device. Similarly, many of the other electrical components could be replaced by other equivalent circuitry or their function could be performed by other circuitry of a different type. For example, the output source 34 could use any voltage responsive device. Other features could be added, such as a signal back to the caller indicating when to provide the extension signal. More than one extension signal could be provided at a time to call service extensions.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A telephone device, comprising:
    a ring detector connectable as a parallel extension to a standard telephone line and in communication with a central telephone office over said standard telephone line for detecting the first ring of an incoming call from a caller on the line and for providing a first ring signal in response thereto for causing an answer timing circuit to begin measuring the time from the first ring of the incoming call and to provide a connecting signal when the incoming call signal continues for a signaling period of time;
    a holding circuit responsive to the connecting signal comprising a hold coil for providing a hold voltage on the telephone line for causing the ringing of an incoming call to be stopped and for providing an open line to be connected by a central telephone control circuit to enable the caller to provide an extension signal;
    an extension signal detector for detecting the extension signal and for providing a selection signal if the extension signal indicates the selection of that extension; and
    an output source responsive to the selection signal for providing an output to a user of the device indicating an incoming call and an output through the telephone line to the caller indicating that the selected extension has received the extension signal and is providing an output response.

2. The device of claim 1, further comprising a control circuit for controlling the ring detector and the output source, the control circuit being operable for providing an answer signal following an initial time interval after the first ring of an incoming call is detected for causing the extension signal detector to connect to receive the extension signal.

3. The device of claim 2 in which the control circuit comprises:
    a call memory element responsive to the extension signal detector for storing an indication when an incoming call is detected; and
    a call timer, the call timer being responsive to the indication stored in the call memory element for starting the operation of the call timer, the call timer providing the answer signal after the initial time interval.

4. The device of claim 3 in which the call memory element comprises an activating element and a switchable element, the activating element being for providing an activating signal in response to the selection signal for switching the switchable element into a conductive state, the switchable element remaining in the conductive state until a voltage across the switchable element falls below a threshold voltage.

5. The device of claim 4 in which the control circuit further comprises a call reset element connected across the switchable element and responsive to a reset signal for dropping the voltage across the switchable element below the threshold voltage.

6. The device of claim 2 in which the control circuit is further operable for providing first and second time intervals during which the extension signal may be provided, the control circuit comprising first and second timing circuits for determining the first and second time intervals.

7. The device of claim 6 in which the first timing circuit is connected for providing a set signal to the second timing circuit at the end of the first time interval for beginning the second time interval.

8. The device of claim 7 in which the control circuit further comprises an off hook detector circuit for detecting a connected voltage on the telephone line, the connected voltage indicating that a connection has been made by a telephone instrument connected to the telephone line, the off hook detector circuit providing an off hook signal for beginning the second time interval.

9. The device of claim 1, further comprising a power supply circuit for supplying power when the first ring of an incoming call is detected.

10. The device of claim 1, further comprising remote control means for receiving a remote control signal from the caller and for controlling the operation of an electrical switch in response to the remote control signal.

11. The device of claim 10 in which the remote control means comprises a remote control signal detector for detecting the remote control signal and for providing a corresponding switch control signal to the electrical switch, the remote control means further comprising means responsive to the switch control signal for providing an output to the caller indicating the operation of the electrical switch.

12. A telephone system, comprising:
    a plurality of the telephone devices of claim 1, each connected as an extension to the same standard telephone line and in communication with a central telephone office over said telephone line, each of the telephone devices having a corresponding extension signal for indicating selection of that telephone device.

13. The system of claim 12 in which the output means of at least one of the telephone devices comprises an extension signal detector circuit for detecting the corresponding extension signal of that telephone device and a signal source responsive to the extension signal detector circuit for providing the output when the corresponding extension signal is detected.

14. The system of claim 13 in which the extension signal has at least one frequency, the extension signal detector circuit comprising a tone detector for detecting the frequency of the extension signal.

15. The system of claim 13 in which the signal source provides the output both to a user of the selected telephone device and to the caller.

16. The system of claim 13 in which the output provided by the signal source corresponds to the selected telephone device.

17. The system of claim 12 in which at least one of the telephone devices further comprises input means for receiving an input from a user and extension signaling means for providing an additional extension signal to a selected other one of the telephone devices in response to the user input, the output means of the selected telephone device being further for providing an output in response to the additional extension signal.

18. The system of claim 12 in which at least one of the telephone devices further comprises a mode switch for switching between a common mode for causing the output means to provide the output in response to the detection of the incoming call signal and a personal mode for causing the output means to provide the output only in response to the corresponding extension signal.

* * * * *